United States Patent [19]

Flies

[11] 4,436,993

[45] Mar. 13, 1984

[54] ELECTRONIC KEY

[75] Inventor: William P. Flies, Burnsville, Minn.

[73] Assignee: Datakey, Inc., Burnsville, Minn.

[21] Appl. No.: 338,366

[22] Filed: Jan. 11, 1982

[51] Int. Cl.$^3$ .............................................. H04Q 3/00

[52] U.S. Cl. .................................... 235/382; 235/492; 235/487; 361/172

[58] Field of Search ............... 235/443, 487, 382, 492; 70/277, 278, 271, 434, 409; 361/171, 172; 194/4 R; 200/44, 42 A, 42 R, 42 T, 252, 329; 307/10 AT

[56] References Cited

U.S. PATENT DOCUMENTS

| | | | |
|---|---|---|---|
| 2,057,532 | 10/1936 | MacDonald | 200/42 R |
| 3,222,534 | 12/1965 | Scott | 200/44 |
| 3,644,745 | 2/1972 | Bell | 260/42 R |
| 3,686,659 | 8/1972 | Bostrom | 235/443 |
| 3,754,214 | 8/1973 | Matsumoto et al. | 235/382 |
| 3,782,148 | 1/1974 | Goldman | 70/278 |
| 3,848,229 | 11/1974 | Perron et al. | 340/149 A |
| 3,859,634 | 1/1975 | Perron et al. | 340/149 A |
| 4,050,063 | 9/1977 | Schull | 235/382 |
| 4,225,758 | 9/1980 | Konou et al. | 200/4 |

FOREIGN PATENT DOCUMENTS

| | | | |
|---|---|---|---|
| 1060961 | 7/1959 | Fed. Rep. of Germany | 200/42 |

OTHER PUBLICATIONS

"Electronics", 8/8/74.

*Primary Examiner*—G. Z. Rubinson
*Assistant Examiner*—Robert Lev
*Attorney, Agent, or Firm*—Schroeder, Siegfried, Vidas & Arrett

[57] ABSTRACT

An improved electronic key for use in combination with an electrical receptacle adapted to receive the key wherein switch contacts on the key are designed for making electrical contact with corresponding receptacle contacts when the key is turned in the receptacle to an "on" position only after the other key contacts make electrical contact with the corresponding receptacle contacts. Conversely, the switch contacts are the first to break electrical contact when the key is turned past the "on" position in either direction.

6 Claims, 4 Drawing Figures

ELECTRONIC KEY

DESCRIPTION

BACKGROUND OF THE INVENTION

This invention relates to an improved design for electronic keys. Electronic keys are intended for activating a master circuit or electrical operating system of some kind such as a computer system and/or providing electronic information to an operating circuit when such a key is inserted into a suitable electrical receptacle or the like. Electronic keys of the type with which this invention is concerned are described in U.S. Pat. No. 4,297,569 entitled "Microelectronic Memory Key With Receptacle and Systems Therefor", which is assigned to the same assignee as is this invention. The following patent applications, also assigned to the same assignee, relate to electrical systems, electronic keys and receptacles therefor: U.S. patent aplication Ser. No. 163,307, filed June 26, 1980 entitled "Improved Microelectronic Memory Key With Receptacle and Systems Therefor"; U.S. patent application Ser. No. 286,362, filed July 23, 1981 entitled "Receptacle For Electronic Information Key" and U.S. design patent application Ser. No. 153,720, filed May 27, 1980, entitled "Electronic Information Key". The subject matter of the U.S. patent and the copending patent applications is incorporated herein by reference.

The electronic data keys, sometimes referred to as microelectronic data keys, memory keys, data keys or simply keys, to which this invention relates are intended to provide data bit storage in a durable portable medium. The key is not only concerned with the storage of data (information) and its introduction into a computer or other electrical circuit system but also with the portability of stored data, whether the purpose of the electrical circuit system into which the key is introduced is the storage of information or any other purpose. Detailed information concerning the overall systems in which these keys are used may be obtained by reference to the foregoing issued patent and copending patent applications.

SUMMARY OF THE INVENTION

The purpose of this invention is to provide electronic data keys of improved design wherein switch contacts, as opposed to other electrical contacts on the key, are arranged in such a manner as to provide for the "making" of the switch contacts after the other contacts have been "made" when the key is inserted into a suitable electrical receptacle and rotated to an "on" position. The design also provides for "breaking" the switch contacts before the other electrical contacts have been "broken".

DESCRIPTION OF THE PREFERRED EMBODIMENT

Figure 4:
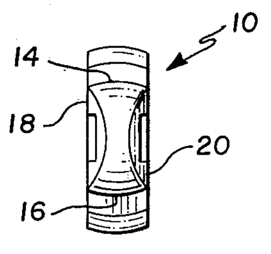
FIG. 4 is an end elevational view taken from the left-hand end of FIG. 2.

With specific reference to the Figures of the drawing, there is shown an electronic key comprised of non-conductive head and insert body portions, respectively designated 10 and 12. Body insert portion 12, as shown in the Figures, is preferably generally rectangular in cross-section having a major dimension between upper and lower curved surfaces 14 and 16 (best shown in FIG. 4) and a minor smaller dimension between flat side surfaces 18 and 20 (also best shown in FIG. 4). Body insert portion 12 need not have flat sides and may be any suitable shape in cross-section such as eliptical, circular or otherwise.

Preferably, the key will be made of a molded non-conductive plastic such as the acetal resin types. An electrical circuit element such as microelectronic circuit element or the like (not shown) is encapsulated in the body of the key. The microelectronic circuit element includes a number of electrical leads which extend to the exterior of body portion 12 as a plurality of contacts, indicated at 22 in FIG. 3. Contacts 22 lay in grooves 24. The contacts and grooves are preferably arranged and disposed in generally opposing sets on body 12 as shown.

Figure 1:
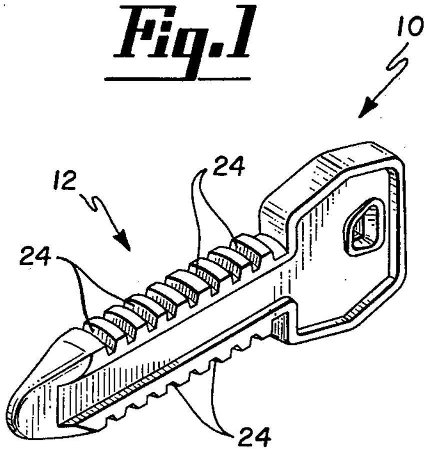
FIG. 1 is a perspective view of an electronic information key.
Figure 2:
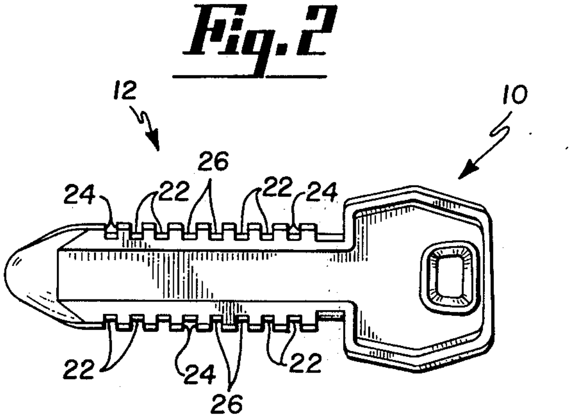
FIG. 2 is a side elevational view of the key shown in FIG. 1.
Figure 3:
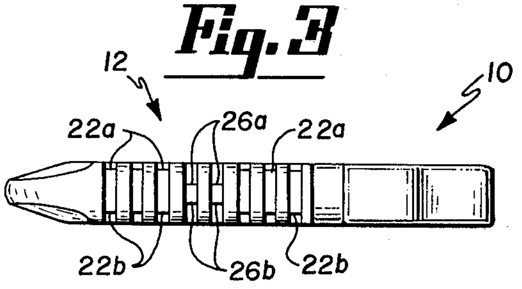
FIG. 3 is a bottom plan view (a top plan view if included would be the same) of the key of FIGS. 1 and 2.

Contacts 22 extend into selected grooves 24 after insertion molding to allow the respective leads to exit from the interior of body 12 into the grooves. The extending contacts are easily bent into the proper position in the grooves by utilizing a forming head tool to make contact with the surface of the leads and urge them into a laying position in the grooves as shown in FIG. 3.

Upon being bent into a laying position in the respective grooves, contacts 22 define bodies of certain dimension extending transversely in the grooves and having leading edges *22a* and trailing edges *22b*. The leading and trailing edges are defined with respect to the direction in which the key is rotated to the "on" or "locked" position, a clockwise position being assumed in this particular case. In this instance then, the leading edge *22a* of all the contacts on the key as indicated in FIG. 3 will first contact mating electrical contacts in a suitable receptacle into which the key is inserted and turned. The trailing edges *22b* will then make "contact" with the corresponding receptacle contacts following the "making" of contact by the leading edges. This relationship may be reversed if the key is to be turned in a receptacle designed for turning in either the clockwise or counterclockwise direction.

Body 12 also includes a pair of switch contacts 26 seated in certain of the grooves. Switch contacts 26 may vary in number and position on the key. Preferably, two such contacts will be included on at least one surface of the key; one pair being shown in FIG. 3. As with the other contacts 22, switch contacts 26 include leading edges *26a* and trailing edges *26b*. However, in the case of leading edges *26a* of switch contacts 26, the edges are shown recessed with respect to the leading edges *22a* of the other contacts 22. The purpose of the recessed arrangement of leading edges *26a* of switch contacts 26 is to provide for the "making" of contact in an electrical receptacle by switch contacts 26 after contact has been "made" by the other contacts 22. Likewise, when the key is to be removed from the receptacle contact will be "broken" by contacts 26 prior to the "breaking" of contact by contacts 22. As shown, the trailing edges are preferably recessed also to provide the delayed "on"

condition and early "off" condition for data keys turned in either direction. The same effect is attained if only one of the switch contacts 26 has recessed leading and trailing edges as with both being recessed.

It is desirable that the switch "on" condition occur at a radially delayed position in reference to the other contacts to assure all physical contacts are made prior to the switch signal to the key receptacle and the related electrical system, such as a microprocessor. Upon switch signal, the microprocessor applies power to the data key's embodied memory. If the power were applied prior to full contact by certain of the embodied memory's leads, the memory circuit could receive erroneous signals and prematurely effect unplanned requests. Likewise, the early "off" signal allowed by the abbreviated switch contacts 36 alert the microprocessor to place the data key memory into a "standby" state via the other contacts 22 prior to their impending disconnect. This places the data key in a proper "standby" mode in preparation for the next insertion.

Having described the preferred embodiment of the invention, the exclusive rights thereto are set forth in the following claims.

What is claimed:

1. A key-like device having head and insert-body portions, the insert-body portion being adapted for insertion into a receptacle and rotation therein to a "locked" position and including:

two sets of generally oppositely disposed spaced grooves transversely extending over the surface of the insert-body of the key so as to be in alignment with the rotational movement of the insert-body when rotated in a receptacle, an electrical circuit element encapsulated within the key, a plurality of spaced electrical contacts formed by a plurality of electrical leads connected to the electrical circuit element, each of the leads extending outwardly from the key body and lying in a respective groove thereby forming a plurality of spaced electrical contacts on the key body, each contact having a certain contact dimension in each respective groove and defining leading and trailing ends with respect to the rotational direction of key rotation, and at least one switch contact in a respective groove, the switch contact having a certain contact dimension defined by leading and trailing ends which is smaller than that of the spaced electrical contacts, the leading ends of the switch contact being spaced behind the leading ends of the other contacts with respect to rotation to the "locked" position whereby switch contact is 37 made" after the other contacts are "made."

2. The key of claim 1 wherein:

the inser body includes, in cross-section, a major dimension ith opposing upper and lower surfaces;

a smaller mnor dimension with opposing side surfaces, and the grooves and contacts are on the upper and lower surfaces.

3. The key of claim 2 wherein both the upper and lower surfaces include paired and recessed switch contacts.

4. The key of claim 2 wherein paired switch contacts are included on only one surface.

5. The key of claim 1 wherein the trailing end of the switch contacts is spaced behind the trailing ends of the other electrical contacts whereby the switch contact is "broken" prior to "breaking" the other electrical contacts upon rotation of the key from the "locked" position.

6. The key of claim 1 wherein there is included at least one pair of switch contacts in grooves on the key body.

* * * * *

UNITED STATES PATENT AND TRADEMARK OFFICE

CERTIFICATE OF CORRECTION

PATENT NO. : 4,436,993

DATED : March 13, 1984

INVENTOR(S) : William P. Flies

It is certified that error appears in the above-identified patent and that said Letters Patent are hereby corrected as shown below:

Column 4, line 14, the numeral "37" should be deleted.
Column 4, line 14, before the word "made" a quotation mark should be added.
Column 4, line 17, "inser" should read --insert--.
Column 4, line 18, "ith" should read --with--.
Column 4, line 20, "mnor" should read --minor--.

Signed and Sealed this

*Twenty-ninth* Day of *May 1984*

[SEAL]

*Attest:*

GERALD J. MOSSINGHOFF

*Attesting Officer* *Commissioner of Patents and Trademarks*